United States Patent
Ikarashi

(10) Patent No.: US 10,950,144 B2
(45) Date of Patent: Mar. 16, 2021

(54) SECRET FALSIFICATION DETECTING SYSTEM, SECRET COMPUTATION APPARATUS, SECRET FALSIFICATION DETECTING METHOD, AND PROGRAM

(71) Applicant: NIPPON TELEGRAPH AND TELEPHONE CORPORATION, Chiyoda-ku (JP)

(72) Inventor: Dai Ikarashi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 127 days.

(21) Appl. No.: 15/535,638

(22) PCT Filed: Dec. 22, 2015

(86) PCT No.: PCT/JP2015/085774
§ 371 (c)(1),
(2) Date: Jun. 13, 2017

(87) PCT Pub. No.: WO2016/104476
PCT Pub. Date: Jun. 30, 2016

(65) Prior Publication Data
US 2017/0365192 A1 Dec. 21, 2017

(30) Foreign Application Priority Data
Dec. 26, 2014 (JP) .............................. JP2014-264439

(51) Int. Cl.
| | |
|---|---|
| G06F 21/00 | (2013.01) |
| G09C 1/04 | (2006.01) |
| G09C 1/00 | (2006.01) |
| H04L 9/08 | (2006.01) |
| H04L 9/32 | (2006.01) |
| H04L 9/12 | (2006.01) |

(52) U.S. Cl.
CPC ............... *G09C 1/04* (2013.01); *G09C 1/00* (2013.01); *H04L 9/085* (2013.01); *H04L 9/0869* (2013.01);
(Continued)

(58) Field of Classification Search
CPC .................................................. H04L 2209/46
See application file for complete search history.

(56) References Cited

U.S. PATENT DOCUMENTS
2015/0358155 A1 12/2015 Ikarashi et al.

FOREIGN PATENT DOCUMENTS
WO WO 2014/112548 A1 7/2014

OTHER PUBLICATIONS

Beaver D. (1992) Efficient Multiparty Protocols Using Circuit Randomization. In: Feigenbaum J. (eds) Advances in Cryptology—CRYPTO '91. CRYPTO 1991. Lecture Notes in Computer Science, vol. 576. Springer, Berlin, Heidelberg (Year: 1992).*

(Continued)

*Primary Examiner* — Alexander Lagor
(74) *Attorney, Agent, or Firm* — Oblon, McClelland, Maier & Neustadt, L.L.P.

(57) ABSTRACT

Falsification is detected during secret computation that uses a plurality of types of secret sharing. A secret computation apparatus 1 uses shared values $[a_0], \ldots, [a_{M-1}]$ as inputs, and a function value $[F([a_0], \ldots, [a_{M-1}])]$ obtained with a function F for performing secret computation that uses J types of secret sharing as an output, and detects falsification during secret computation. A random number generating section 12 obtains shared values $[r_0], \ldots, [r_{J-1}]$. A randomizing section 13 multiplies the shared value $[a_m]$ by the shared value $[r_j]$ to calculate a shared value $[a_m r_j]$, and generates a randomized shared value $<a_m>:=<[a_m], [a_m r_j]>$. A secret computation section 14 obtains the function value (Continued)

[F([a$_0$], . . . , [a$_{M-1}$])] while including, in a checksum C$_j$, randomized shared values that are computation objects and randomized shared values that are computation results. A synchronizing section 15 keeps idling until all of secret computation that uses secret sharing are completed. A validating section 16 verifies that the shared value [φ$_j$] obtained by multiplying the sum of shared values [f$_0$], . . . , [f$_{μj-1}$] included in the checksum C$_j$ by the shared value [r$_j$] is equal to the shared value [ψ$_j$] obtained by adding shared values [f$_0$r$_j$], . . . , [f$_{μj-1}$r$_j$] included in the checksum C$_j$.

5 Claims, 3 Drawing Sheets

(52) U.S. Cl.
CPC .................. *H04L 9/12* (2013.01); *H04L 9/32* (2013.01); *H04L 9/3239* (2013.01)

(56) References Cited

OTHER PUBLICATIONS

Damgård, I., Pastro, V., Smart, N., & Zakarias, S. (Aug. 2012). Multiparty computation from somewhat homomorphic encryption. In Annual Cryptology Conference (pp. 643-662). Springer, Berlin, Heidelberg. (Year: 2012).*

International Search Report dated Mar. 29, 2016, in PCT/JP2015/085774 filed Dec. 22, 2015.

Ikarashi et al., "Actively Private and Correct MPC Scheme in t < n/2 from Passively Secure Schemes with Small Overhead", Cryptology ePrint Archive, (2014), 18 pages.

Ikarashi et al., "An Extremely Efficient Secret-sharing-based Multi-Party Computation against Malicious Adversary", SCIS 2013, The 30$^{th}$ Symposium on Cryptography and Information Security, (Jan. 22-25, 2013), pp. 1-8.

Chida et al., "A Three-Party Secure Function Evaluation with Lightweight Verifiability Revisited", CSS2010, (2010), 6 pages, with partial English translation.

Cramer et al., "Share Conversion, Pseudorandom Secret-Sharing and Applications to Secure Computation", TCC, vol. 3378 of Lecture Notes in Computer Science, Springer, (2005), pp. 342-362.

Office Action dated Apr. 25, 2019 in corresponding European Patent Application No. 15 873 044.0, 6 pages.

Office Action dated Sep. 3, 2019 in European Application No. 15 873 044.0-1218.

Office Action dated Mar. 30, 2020 in Chinese Application No. 201580068181.4 (w/English translation).

* cited by examiner

SECRET FALSIFICATION DETECTING SYSTEM, SECRET COMPUTATION APPARATUS, SECRET FALSIFICATION DETECTING METHOD, AND PROGRAM

TECHNICAL FIELD

The present invention relates to a secret computation technique, and more particularly, to a technique for detecting falsification during secret computation.

BACKGROUND ART

A method described in Non-Patent Literature 1 is a conventional technique for detecting falsification during secret computation. In the secret falsification detecting method described in Non-Patent Literature 1, a function F having m inputs and $\mu$ outputs and formed of addition, multiplication by a constant, multiplication, a sum of products, and random permutation on a ring R is calculated on a malicious model having concealability and validity. A malicious model means a model in which an attacker performs any unauthorized activity, whereas a semi-honest model means a model in which an attacker performs an authorized activity but steals a glance at data in the activity.

In Non-Patent Literature 1, falsification is detected during secret computation in three phases. In a randomizing phase, a shared value is converted to a randomized shared value for which validation is possible. In a computation phase, desired secret computation is performed by using operations for randomized shared values, formed of operations in the semi-honest model. In this phase, the computation is performed while the checksums are collected, which are required in the following validating phase. In the validating phase, validation is performed collectively for the checksums collected in the computation phase. When validity is found, the result of computation in the computation phase is output; if validity is not found, the result of computation is not output but only the fact that validity is not found is output.

PRIOR ART LITERATURE

Non-Patent Literature

Non-Patent Literature 1: Dai Ikarashi, Koji Chida, Koki Hamada, and Ryo Kikuchi, "An Extremely Efficient Secret-sharing-based Multi-Party Computation against Malicious Adversary", SCIS 2013, 2013

SUMMARY OF THE INVENTION

Problems to be Solved by the Invention

The secret falsification detecting technique described in Non-Patent Literature 1 requires secret computation that uses one type of secret sharing, but it cannot be applied to secret computation that uses a plurality of types of secret sharing.

Taking the above-described point into account, an object of the present invention is to detect falsification during secret computation that uses a plurality of types of secret sharing.

Means to Solve the Problems

To solve the above-described problem, the present invention provides a secret computation method of detecting falsification during secret computation, with N secret computation apparatuses having, as inputs, shared values $[a_0], \ldots, [a_{M-1}]$ obtained by secret sharing M values $a_0, \ldots, a_{M-1}$ and, as an output, a function value $[F([a_0], \ldots, [a_{M-1}])]$ obtained with a function F for performing secret computation that uses J types of secret sharing, wherein N is an integer equal to or larger than 3, M is an integer equal to or larger than 1, $\mu$ is an integer equal to or larger than 1, J is an integer equal to or larger than 2, m is an integer equal to or larger than 0 and smaller than M, and j is an integer equal to or larger than 0 and smaller than J. The secret falsification detecting method includes a random number generating step in which random number generating sections of the secret computation apparatuses secret share J random numbers $r_0, \ldots, r_{J-1}$ to obtain shared values $[r_0], \ldots, [r_{J-1}]$; a randomizing step in which, assuming that the m-th shared value $[a_m]$ is a shared value obtained by the j-th secret sharing, randomizing sections of the secret computation apparatuses multiply the shared value $[a_m]$ by the shared value $[r_j]$ to calculate a shared value $[a_m r_j]$, and pair the shared value $[a_m]$ and the shared value $[a_m r_j]$ to generate a randomized shared value $\langle a_m \rangle := \langle [a_m], [a_m r_j] \rangle$; a secret computation step in which secret computation sections of the secret computation apparatuses obtain, when performing secret computation that uses the j-th secret sharing, the function value $[F([a_0], \ldots, [a_{M-1}])]$ while including, in a checksum $C_j$, randomized shared values that are computation objects and randomized shared values that are computation results; a synchronizing step in which synchronizing sections of the secret computation apparatuses keep idling until all of secret computation that uses secret sharing are completed; and a validating step in which, assuming that, for $j=0, \ldots, J-1$, $\mu_j$ indicates the total number of randomized shared values included in the j-th checksum $C_j$, and $\langle f_0 \rangle, \ldots, \langle f_{\mu j-1} \rangle$ indicate the randomized shared values included in the j-th checksum $C_j$, validating sections of the secret computation apparatuses verify that the shared value $[\varphi_j]$ obtained by multiplying the sum of shared values $[f_0], \ldots, [f_{\mu j-1}]$ included in the checksum $C_j:=(\langle f_0 \rangle, \ldots, \langle f_{\mu j-1} \rangle)$ by the shared value $[r_j]$ is equal to the shared value $[\psi_j]$ obtained by adding shared values $[f_0 r_j], \ldots, [f_{\mu j-1} r_j]$ included in the checksum $C_j:=(\langle f_0 \rangle, \ldots, \langle f_{\mu j-1} \rangle)$.

Effects of the Invention

According to a secret falsification detecting technique of the present invention, falsification can be detected during secret computation that uses a plurality of types of secret sharing.

DETAILED DESCRIPTION OF THE EMBODIMENTS

Figure 1:
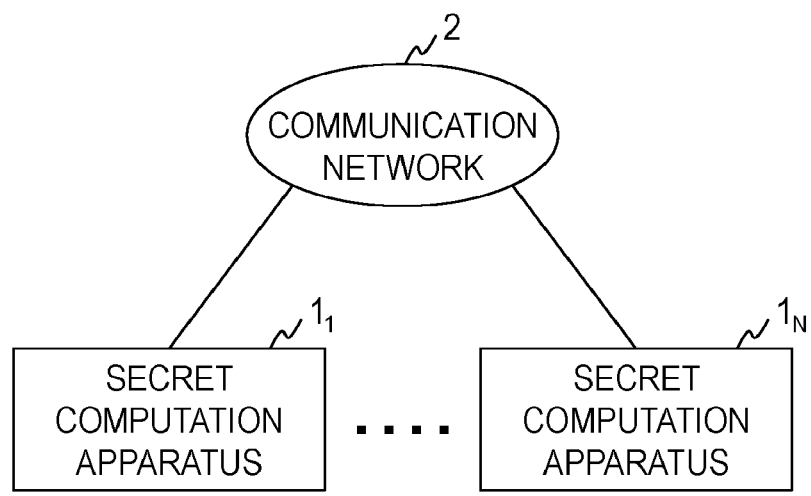
FIG. 1 is a view showing an example of the functional configuration of a secret falsification detecting system.

Prior to a description of an embodiment, the notation method used in this specification and basic technical concepts of the present invention will be described.

Notation Method

Values handled in the present invention are those on a ring R unless otherwise specified. An associative hypercomplex ring A is on the ring R. An associative hypercomplex ring is an associative ring and has a linear space structure on any field, which is compatible with the characteristics of the associative ring. In other words, an associative hypercomplex ring is established when values handled in a vector space fall in a ring not in a field.

The i-th element of a vector X is referred to as $X_i$.

Concealed text of a value $x \in R$ is expressed by [x]. Concealed text is a value obtained by concealing a value with encryption, secret sharing, or other means. When X expresses a set, [X] is a set obtained by concealing each element of the set X.

The number of elements in the set X is expressed by |X|.

A randomized share value of a value $x \in R$ is expressed by <x>. A randomized share value is a pair formed of a share value [x] of a value $x \in R$ and a share value [xr] of the product xr of the value x and a random number $r \in A$. Therefore, the randomized share value can be defined by Formula (1).

$$<x> := ([x],[xr]) \in [R] \times [A] \quad (1)$$

In the randomized share value, the 0-th element ([x] in Formula (1)) is also called the R component, and the first element ([xr] in Formula (1)) is also called the A component.

A space having a random number $r \in A$ as a parameter and formed of randomized share values is expressed by <Rr>.

Security

To prove the security of a protocol in the field of cryptographical theory, users, participants, and attackers are modeled. A malicious model or a semi-honest model is used as such a model. A malicious model means a model in which an attacker performs any unauthorized activity, whereas a semi-honest model means a model in which an attacker performs an authorized activity but steals a glance at data in the activity. Therefore, a protocol for which the security thereof is proved in a malicious model has a higher security than a protocol for which the security thereof is proved in a semi-honest model.

Features of the Present Invention

The conventional secret falsification detecting technique requires secret computation that uses one type of secret sharing, but it cannot detect falsification in secret computation that uses a plurality of types of secret sharing. When a plurality of types of secret sharing are used, it may seem that the conventional secret falsification detecting technique can be used to verify secret computation for each type of secret sharing, but this implementation causes a security problem. To maintain proper security in secret computation that uses a plurality of types of secret sharing, a secret falsification detecting technique according to the present invention is configured to satisfy the following conditions.

1. An identical random number is used when randomized shared values are generated in different types of secret sharing on an identical ring.
2. Secret computation has been completed in all types of secret sharing before validation is performed.

Concealability is improved when verification is performed collectively for as many types of secret sharing as possible compared with when verification is performed for each type of secret sharing independently, because the number of values made public becomes smaller. Therefore, the secret sharing formats for checksums are integrated into one format and verification is performed collectively for different types of secret sharing on an identical ring.

Embodiment

An embodiment of the present invention will be described below in detail. In the drawings, components having identical functions will be denoted by the same reference numerals, and overlaps in the descriptions will be omitted.

Referring to FIG. 1, an example configuration of a secret falsification detecting system according to an embodiment will be described. The secret falsification detecting system includes N ($\geq 3$) secret computation apparatuses $1_1$ to $1_N$. In the present embodiment, the secret computation apparatuses $1_1$ to $1_N$ are separately connected to a communication network 2. The communication network 2 is a circuit switching or packet switching communication network configured to allow mutual communication between the connected secret computation apparatuses $1_1$ to $1_N$, and can be configured, for example, by the Internet, a local area network (LAN), or a wide area network (WAN). Online communication capability through the communication network 2 is not necessarily required between the secret computation apparatuses $1_1$ to $1_N$. For example, information to be input to the secret computation apparatuses $1_1$ to $1_N$ may be stored in a portable recording medium, such as a magnetic tape or a USB memory, and may be input off-line from the portable recording medium to the secret computation apparatuses $1_1$ to $1_N$.

Figure 2:
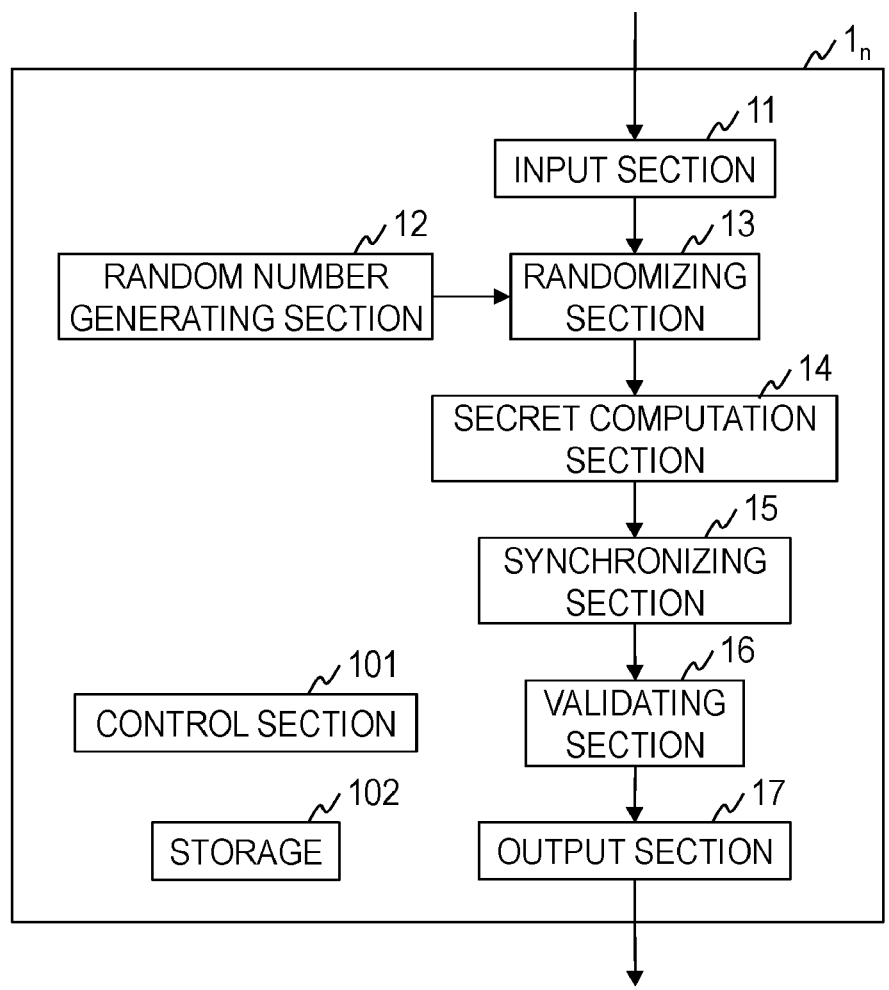
FIG. 2 is a view showing an example of the functional configuration of a secret computation apparatus.

Referring to FIG. 2, an example configuration of the secret computation apparatus $1_n$ (n=1 to N) included in the secret falsification detecting system will be described. The secret computation apparatus $1_n$ includes, for example, a control section 101, a storage 102, an input section 11, a random number generating section 12, a randomizing section 13, a secret computation section 14, a synchronizing section 15, a validating section 16, and an output section 17.

The secret computation apparatus $1_n$ is, for example, a special apparatus configured by reading a special program into a known or special computer having a central processing unit (CPU), a main memory (a random access memory: RAM), and other components. The secret computation apparatus $1_n$ executes processing under the control of the control section 101, for example. Data input to the secret computation apparatus $1_n$ or data obtained by processing is stored in the storage 102, for example, and the data stored in the storage 102 is read into the control section 101 and used for other processing when necessary. At least a part of the processing sections of the secret computation apparatus $1_n$ may be configured by hardware such as an integrated circuit.

Figure 3:
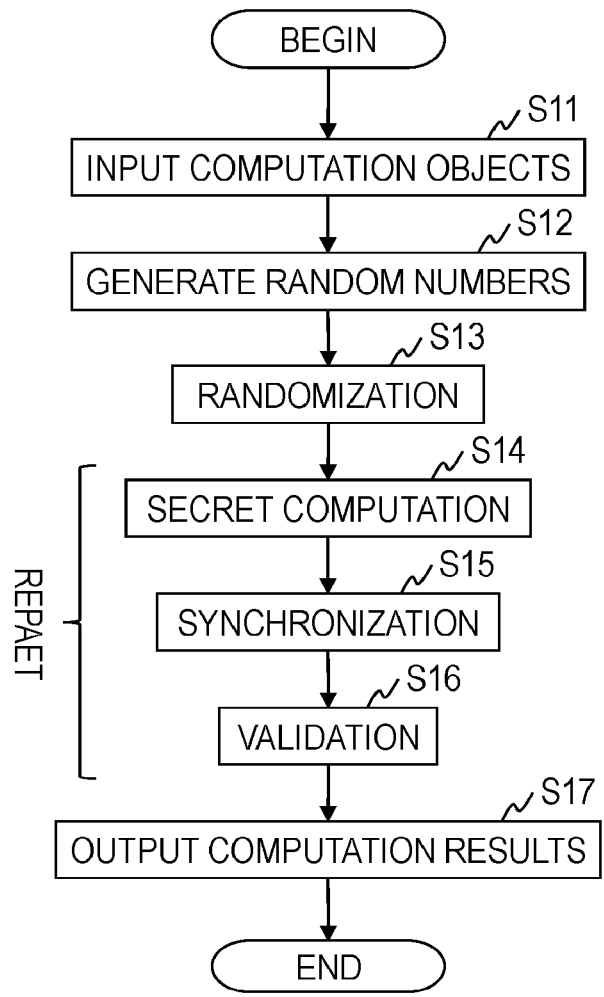
FIG. 3 is a view showing an example of the processing flow of a secret falsification detecting method.

Referring to FIG. 3, the processing procedure of a secret falsification detecting method according to the embodiment will be described.

In step S11, M ($\geq 1$) shared values $[a_0], \ldots, [a_{M-1}]$ are input to the input section 11 of the secret computation apparatus $1_n$. The input shared values $[a_0], \ldots, [a_{M-1}]$ are output to the randomizing section 13. The shared value $[a_m]$ (m=0, ..., M-1) is obtained by secret sharing a value $a_m$. The number M of the input shared values $[a_0], \ldots, [a_{M-1}]$ is appropriately determined on the basis of the content of the secret computation performed in the secret computation section 14.

Any secret sharing method can be used if a desired operation can be performed in secret computation. In the present embodiment, the shared values $[a_0], \ldots, [a_{M-1}]$ should be obtained by J ($\geq 2$) types of secret sharing. A plurality of types of secret sharing may be performed on an identical ring or on different rings. In addition, a plurality of types of secret sharing performed on an identical ring are mixed with secret sharing performed on a different ring. Even if the shared values $[a_0], \ldots, [a_{M-1}]$ are obtained only by one type of secret sharing, and a plurality of types of secret sharing are used as a whole by performing conversion in secret computation, a falsification detecting technique according to the present invention can be applied. For details of secret sharing methods to which the technique can be applied, refer to Reference Literature 1 noted below or others.

Reference Literature 1: Koji Chida, Koki Hamada, Dai Ikarashi, and Katsumi Takahashi, "A Three-Party Secure Function Evaluation with Lightweight Verifiability Revisited", CSS2010, 2010

In step S12, the random number generating section 12 generates shared values $[r_0], \ldots, [r_{J-1}]$ of J random numbers $r_0, \ldots, r_{J-1}$ selected from the associative hypercomplex ring A. The generated shared values $[r_0], \ldots, [r_{J-1}]$ are output to the randomizing section 13. The shared values $[r_0], \ldots, [r_{J-1}]$ need to be generated while the random numbers $r_0, \ldots, r_{J-1}$ are concealed from all of the secret computation apparatuses $1_1$ to $1_N$.

For example, the secret computation apparatuses $1_1$ to $1_N$ included in the secret falsification detecting system can cooperatively generate shared values $[r_j]$ of random numbers $r_j$. Specifically, the secret computation apparatuses $1_n$ first generate random numbers $r_n$ individually. Next, based on the concealment method described in Reference Literature 1, described above, the shared values $[r_n]$ of the random numbers $r_n$ are generated. Then, the secret computation apparatuses $1_n$ calculate $[r_j]=\Sigma_{n<N}[r_n]$ to obtain the shared values $[r_j]$ of the random numbers $r_j$ individually. With this configuration, the shared values $[r_j]$ of random numbers $r_j$ can be obtained while none of the secret computation apparatuses $1_1$ to $1_N$ know the random numbers $r_j$. If random numbers are allowed to be shared beforehand or pseudo-random numbers are allowed to be used, replicated secret sharing can be used to generate the shared values $[r_j]$ of random numbers $r_j$. When replicated secret sharing is used, the shared values $[r_j]$ of random numbers $r_j$ can be generated without any communication between the secret computation apparatuses $1_1$ to $1_N$. For details of replicated secret sharing, refer to Reference Literature 2 below.

Reference Literature 2: R. Cramer, I. Damgard, and Y. Ishai, "Share conversion, pseudorandom secret-sharing and applications to secure computation", TCC., Vol. 3378 of Lecture Notes in Computer Science, pp. 342-362, Springer, 2005.

When different types of secret sharing performed on an identical ring exist among J types of secret sharing, the shared value for one type of secret sharing is converted to a shared value for the other type of secret sharing to make the random numbers equal. Even in this conversion, falsification should be able to be detected or falsification should be impossible. For example, when j-th (j=0, ..., J-1) secret sharing and j'-th (j'=0, ..., J-1, j≠j') secret sharing are on an identical ring, a shared value $[r_j]$ is generated by secret sharing a random number $r_j$ used for the j-th secret sharing, and the shared value $[r_j]$ is converted to a shared value $[r_{j'}]$ obtained by the j'-th secret sharing, with a method in which falsification can be detected or a method in which falsification is impossible. For example, a method in which falsification is impossible, used for converting replicated secret sharing to linear secret sharing is described in Reference Literature 2, described above.

In step S13, the randomizing section 13 uses the shared values $[a_0], \ldots, [a_{M-1}]$ and the shared values $[r_0], \ldots, [r_{J-1}]$ to generate randomized shared values $<a_0>, \ldots, <a_{M-1}>$. Specifically, assuming that the m-th shared value $[a_m]$ is the shared value obtained by the j-th secret sharing for m=0, ..., M−1, the randomizing section 13 uses the shared value $[a_m]$ and the shared value $[r_j]$ to obtain $[a_m r_j]=[a_m]\times[r_j]$ with the secret computation method described in Reference Literature 1, described above, and makes the shared value $[a_m]$ and the shared value $[a_m r_j]$ as a pair to generate the randomized shared value $<a_m>=([a_m], [a_m r_j])$. The generated randomized shared values $<a_0>, <a_{M-1}>$ are output to the secret computation section 14.

In step S14, the secret computation section 14 applies a function F for performing secret computation that uses J types of secret sharing to the randomized shared values $<a_0>, \ldots, <a_{M-1}>$ to obtain the concealed function value $[F([a_0], \ldots, [a_{M-1}])]$. The function F is calculated while the randomized shared values that are computation objects and the randomized shared values that are computation results are included in J checksums corresponding to the types of secret sharing used. For example, in the operation that uses the j-th (j=0, ..., J-1) secret sharing, the randomized shared values that are computation objects and the randomized shared values that are computation results are added to the j-th checksum $C_j:=<f_0>, \ldots, <f_{\mu_{j-1}}>$, where $<f_0>, \ldots, <f_{\mu_{j-1}}>$ are the randomized shared values that are computation objects or computation results, the subscript $\mu_{j-1}$ means $\mu_{j-1}$, and $\mu_j$ indicates the number of randomized shared values included in the checksum $C_j$. The initial value of $\mu_j$ is 0. Every time randomized shared values are newly included in the checksum $C_j$, the value is increased by the number of the randomized shared values newly added. The randomized shared values to be included in the checksum and the timing when the randomized shared values are included in the checksum differ according to the type of operations (for example, addition, multiplication by a constant, multiplication, the sum of products, and random permutation) in secret computation. Details thereof are the same as in the secret falsification detecting method described in Non-Patent Literature 1.

In step S15, the synchronizing section 15 executes synchronization processing (SYNC) for keeping idling until all of secret computation complete for all types of secret sharing, before validation is performed. When detecting the completion of all of the secret computation for all the types of secret sharing, the synchronizing section 15 outputs the function value $[F([a_0], \ldots, [a_{M-1}])]$ requested by the secret computation section 14 and J checksums $C_0, \ldots, C_{J-1}$ to the validating section 16.

In step S16, the validating section 16 verifies the checksums $C_0, \ldots, C_{J-1}$ by using the shared values $[r_0], \ldots [r_{J-1}]$ to validate the function value $[F([a_0], \ldots, [a_{M-1}])]$. When it is determined that no falsification is found after verifying all of the J checksums $C_0, \ldots, C_{J-1}$, the validating section 16 outputs the function value $[F([a_0], \ldots, [a_{M-1}])]$ to the output section 17. When it is determined that falsification is found, the validating section 16 outputs information indicating that determination to the output section 17.

When it is determined that no falsification is found in step S16, if subsequent processing remains to calculate the desired function, the procedure may return to step S14 again to repeatedly execute processing from secret computation to validation. In that case, each time validation is completed, the randomized shared values included in the checksums $C_0, \ldots, C_{J-1}$ may be discarded. This repetition of secret computation and validation is necessary when values guaranteed to be not falsified are disclosed and subsequent processing is executed by using those values. This is because disclosing falsified values may impair concealability.

In step S17, the output section 17 outputs the function value [F([a_0], ..., [a_{M-1}])] or the information indicating that falsification is found, received from the validating section 16.

The j-th checksum $C_j$ is verified on the basis of the shared value $[\varphi_j]$ obtained by multiplying the sum of the R components $[f_0], \ldots, [f_{\mu j-1}]$ of the randomized shared values included in the checksum $C_j$, by the shared value $[r_j]$, and the shared value $[\psi_j]$ obtained by adding the A components $[f_0 r_j], \ldots, [f_{\mu j-1} r_j]$ of the randomized shared values included in the checksum $C_j$. Specifically, the validating section 16 verifies the checksum $C_j$ in the following manner, for example. First, shared values $[\rho_0], \ldots, [\rho_{\mu j-1}]$ of $\mu_j$ random numbers $\rho_0, \ldots, \rho_{\mu j-1}$ on an associative hypercomplex ring A are generated. The shared values $[\rho_0], \ldots, [\rho_{\mu j-1}]$ should be generated with the random numbers $\rho_0, \ldots, \rho_{\mu j-1}$ being concealed from all of the secret computation apparatuses $1_n$. The shared values $[\rho_0], \ldots, [\rho_{\mu j-1}]$ need to be generated in the same manner as in the random number generating section 12. Next, the shared value $[\varphi_j]$ is obtained by Formula (2), described below, by using the R components $[f_0], \ldots, [f_{\mu j-1}]$ of the randomized shared values included in the checksum $C_j$, the shared values $[\rho_0], \ldots, [\rho_{\mu j-1}]$ of the random numbers $\rho_0, \ldots, \rho_{\mu j-1}$, and the shared value $[r_j]$ of the random numbers $r_j$.

$$[\varphi_j] := \left( \sum_{i < \mu_j} [f_i][\rho_i] \right)[r_j] \quad (2)$$

The shared value $[\psi_j]$ is also obtained by Formula (3), described below, by using the A components $[f_0 r_j], \ldots, [f_{\mu j-1} r_j]$ of the randomized shared values included in the checksum $C_j$, and the shared values $[\rho_0], \ldots, [\rho_{\mu j-1}]$ of the random numbers $\rho_0, \ldots, \rho_{\mu j-1}$.

$$[\psi_j] := \sum_{i < \mu_j} [f_i r_j][\rho_i] \quad (3)$$

Then, the shared value $[\delta_j] = [\varphi_j] - [\psi_j]$ is recovered by subtracting the shared value $[\psi_j]$ from the shared value $[\varphi_j]$. The recovery method needs to be the recovery operation of the secret sharing corresponding to each shared value, and validation is performed in a malicious model. Specifically, each secret computation apparatus $1_n$ (n=0, ..., N-1) sends the shared value $[\delta_j]$ to another secret computation apparatus $1_{n'}$ (n'=0, ..., N-1, n≠n') to check the consistency of the shared values in order to perform complete validation. In that case, the total amount of communication is N*(N-1), where the total number of secret computation apparatuses $1_n$ is N. When the amount of data of the shared values is large, if a method based on probability is used, the total amount of communication can be reduced to N*(K-1), where K indicates the number of secret computation apparatuses $1_n$ required for recovery. Secret computation includes a semi-honest operation that includes recovery for which validity is not guaranteed. Even if recovery for which validity is not guaranteed is included as a component of secret computation, it does not affect the security of the whole secret computation.

When the recovered values $\delta_0, \ldots, \delta_{J-1}$ are zero in all of the secret computation apparatuses $1_1, \ldots, 1_N$, it is determined that no falsification occurred in the whole secret computation. If a recovered value $\delta_j$ is not zero in any of the secret computation apparatuses $1_j$, it is determined that falsification occurred in the secret computation.

When different types of secret sharing exist on an identical ring among J types of secret sharing, if validation is performed collectively for as many types of secret sharing as possible, concealability is improved because the number of values made public becomes smaller. For example, when j-th (j=0, ..., J-1) secret sharing and j'-th (j'=0, ..., J-1, j≠j') secret sharing are on an identical ring, validation is performed in the following manner. First, the shared value $[\varphi_j]$ obtained from the checksum $C_j$ as described above and the shared value $[\psi_j]$ obtained from the checksum $C_j$ as described above are converted to those obtained by j'-th secret sharing. Then, it is verified that the shared value $[\varphi_j + \varphi_{j'}]$ obtained by adding the converted shared value $[\varphi_j]$ to the shared value $[\varphi_{j'}]$ calculated from the checksum $C_{j'}$, is equal to the shared value $[\psi_j + \psi_{j'}]$ obtained by adding the converted shared value $[\psi_j]$ to the shared value $[\psi_{j'}]$ calculated from the j'-th checksum $C_{j'}$. In other words, $[\delta] = ([\varphi_j + \varphi_{j'}]) - ([\psi_j + \psi_{j'}])$ is calculated for all combinations of all types of secret sharing on each identical ring, and when the recovery value $\delta$ is zero, it is determined that no falsification occurred in secret computation that uses j-th secret sharing and j'-th secret sharing, as a whole. When $[\delta] = ([\varphi_j + \varphi_{j'}]) - ([\psi_j + \psi_{j'}])$ is calculated and the recovery value $\delta$ is not zero, it is determined that falsification occurred in one of the operations of secret computation that uses j-th secret sharing and j'-th secret sharing. In this manner, verification is performed for all combinations of all types of secret sharing on each identical ring to verify that no falsification occurred in the whole secret computation. In the present embodiment, one example has been described in which two types of secret sharing exist on an identical ring. Validation can be performed with the same method even if three or more types of secret sharing exist on an identical ring.

The basic concept of validation will be described below. Checksum verification means verifying $[f_i][r_j] - [f_i r_j] = 0$ when each randomized shared value $<f_i>$ is focused on. Assuming that the shared value $[f_i]$ and the shared value $[f_i r_j]$ are both falsified to be $[f_i + x]$ and $[f_i r_j + y]$, Formula (4) is obtained during verification.

$$[f_i + x][r_j] - [f_i r_j + y] = [x r_j - y] \quad (4)$$

An attacker needs to manipulate $[f_i]$ and $[f_i r_j]$ to make the value of $(x r_j - y)$ zero. Since the attacker does not know the random number $r_j \in A$, the probability of satisfying the above-described condition is $1/|A|$. In the present embodiment, since the random numbers $\rho_0, \ldots, \rho_{\mu j-1}$ are multiplied, the probability of successful falsification is $2/|A|$ at most.

As described above, the secret falsification detecting system according to the present embodiment can detect falsification even in secret computation that uses a plurality of types of secret sharing.

The present invention is not limited to the above described embodiment, and it is needless to say that appropriate changes can be made to the above embodiment without departing from the scope of the present invention. Each type of processing described in the embodiment may be executed not only time sequentially according to the order of description but also in parallel or individually when necessary or according to the processing capabilities of the apparatuses that execute the processing.

Program and Recording Medium

When various types of processing functions in each apparatus, described in the embodiment, are implemented by a computer, the processing details of the functions that should be provided by each apparatus are described in a program. When the program is executed by a computer, the processing functions in each apparatus are implemented on the computer.

The program containing the processing details can be recorded in a computer-readable recording medium. The computer-readable recording medium can be any type of medium, such as a magnetic recording device, an optical disc, a magneto-optical recording medium, or a semiconductor memory.

This program is distributed by selling, transferring, or lending a portable recording medium, such as a DVD, a CD-ROM, or a USB memory, with the program recorded on it, for example. The program may also be distributed by storing the program in a storage of a server computer and transferring the program from the server computer to another computer through the network.

A computer that executes this type of program first stores the program recorded on the portable recording medium or the program transferred from the server computer in its storage. Then, the computer reads the program stored in its storage and executes processing in accordance with the read program. In a different program execution form, the computer may read the program directly from the portable recording medium and execute processing in accordance with the program, or the computer may execute processing in accordance with the program each time the computer receives the program transferred from the server computer. Alternatively, the above-described processing may be executed by a so-called application service provider (ASP) service, in which the processing functions are implemented just by giving program execution instructions and obtaining the results without transferring the program from the server computer to the computer. The program of this form includes information that is provided for use in processing by the computer and is treated correspondingly as a program (something that is not a direct instruction to the computer but is data or the like that has characteristics that determine the processing executed by the computer).

In the description given above, the apparatuses are implemented by executing the predetermined programs on the computer, but at least a part of the processing details may be implemented by hardware.

What is claimed is:

1. A secret falsification detecting method of detecting falsification during secret computation, with N secret computation apparatuses having, as inputs, shared values $[a_0], \ldots, [a_{M-1}]$ obtained by secret sharing M values $a_0, \ldots, a_{M-1}$ and, as an output, a function value $[F([a_0], \ldots, [a_{M-1}])]$ obtained with a function F for performing secret computation that uses J types of secret sharing, wherein N is an integer equal to or larger than 3, M is an integer equal to or larger than 1, $\mu$ is an integer equal to or larger than 1, J is an integer equal to or larger than 2, m is an integer equal to or larger than 0 and smaller than M, and j is an integer equal to or larger than 0 and smaller than J;

the secret falsification detecting method comprising:

by circuitry of each of the secret computation apparatuses;

obtaining shared values $[r_0], \ldots, [r_{J-1}]$ by distributing J random numbers $r_0, \ldots, r_{J-1}$, by the secret sharing in a random number generating step such that the random numbers $r_0, \ldots, r_{J-1}$ are concealed from all of the N secret computation apparatuses;

calculating a shared value $[a_m r_j]$ by multiplying the shared value $[a_m]$ by the shared value $[r_j]$, and generating a randomized shared value $\langle a_m \rangle := \langle a_m, [a_m r_j] \rangle$ by pairing the shared value $[a_m]$ and the shared value $[a_m r_j]$, wherein the m-th shared value $[a_m]$ is a shared value obtained by the j-th secret sharing, in a randomizing step;

obtaining, when performing secret computation that uses the j-th secret sharing, the function value $[F([a_0], \ldots, [a_{M-1}])]$ while including, in a checksum $C_j$, randomized shared values that are computation objects and randomized shared values that are computation results in a secret computation step;

waiting until all of secret computation that uses secret sharing are completed in a synchronizing step;

verifying that the shared value $[\varphi_j]$ obtained by multiplying the sum of shared values $[f_0], \ldots, [f_{\mu j-1}]$ included in the checksum $C_j := (\langle f_0 \rangle, \ldots, \langle f_{\mu j-1} \rangle)$ by the shared value $[r_j]$ is equal to the shared value $[\psi_j]$ obtained by adding shared values $[f_0 r_j], \ldots, [f_{\mu j-1} r_j]$ included in the checksum $C_j := (\langle f_0 \rangle, \ldots, \langle f_{\mu j-1} \rangle)$, wherein, for $j=0, \ldots, J-1$, $\mu_j$ indicates the total number of randomized shared values included in the j-th checksum $C_j$, and $\langle f_0 \rangle, \ldots, \langle f_{\mu j-1} \rangle$ indicate the randomized shared values included in the i-th checksum $C_j$, in a validating step; and when it is determined that no falsification is found after verifying all of J checksums $C_0, \ldots, C_{J-1}$, outputting the function value $[F([a_0], \ldots, [a_{M-1}])]$, and when it is determined that falsification is found, outputting information indicating that falsification is found, wherein j' is an integer equal to or larger than 0 and smaller than J, $j \neq j'$, the j-th secret sharing and the j'-th secret sharing are on an identical ring, and the j-th secret sharing can be converted to the j'-th secret sharing with a method in which falsification can be detected or a method in which falsification is impossible, in the random number generating step, the shared value $[r_j]$ is generated by secret sharing the random number $r_j$ by the j-th secret sharing, and the shared value $[r_j]$ is converted to a shared value $[r_{j'}]$ obtained by the j'-th secret sharing, and in the validating step, the shared value $[\varphi_j]$ calculated from the j-th checksum $C_j$ and the shared value $[\psi_j]$ calculated from the checksum $C_j$ are converted to shared values obtained by the j'-th secret sharing, and it is verified that the shared value $[\varphi_j + \varphi_{j'}]$ obtained by adding the shared value $[\varphi_j]$ to the shared value $[\varphi_{j'}]$ calculated from the j'-th checksum $C_{j'}$ is equal to the shared value $[\psi_j + \psi_{j'}]$ obtained by adding the shared value $[\psi_j]$ to the shared value $[\psi_{j'}]$ calculated from the j'-th checksum $C_{j'}$.

2. The secret falsification detecting method according to claim 1, wherein the secret computation step, the synchronizing step, and the validating step are repeatedly executed a plurality of times.

3. A secret falsification detecting system for detecting falsification during secret computation, with N secret computation apparatuses having, as inputs, shared values $[a_0], \ldots, [a_{M-1}]$ obtained by secret sharing M values $a_0, \ldots, a_{M-1}$ and, as an output, a function value $[F([a_0], \ldots, [a_{M-1}])]$ obtained with a function F for performing secret computation that uses J types of secret sharing, wherein N is an integer equal to or larger than 3, M is an integer equal to or larger than 1, $\mu$ is an integer equal to or larger than 1, J is an integer equal to or larger than 2, m is an integer equal to or larger than 0 and smaller than M, and j is an integer equal to or larger than 0 and smaller than J;

each of the secret computation apparatuses comprising:

circuitry configured to obtain shared values $[r_0]$m . . . , $[r_{J-1}]$ by distributing J random numbers $r_0, \ldots, r_{J-1}$ by the secret sharing such that the random numbers $r_0, \ldots, r_{J-1}$ are concealed from all of the N secret computation apparatuses;

calculate a shared value $[a_m r_j]$ by multiplying the shared value $[a_m]$ by the shared value $[r_j]$, and generate a randomized shared value $<a_m>:=<[a_m], [a_m r_j]>$ by pairing the shared value $[a_m]$ and the shared value $[a_m r_j]$, wherein the m-th shared value $[a_m]$ is a shared value obtained by the j-th secret sharing;

obtain, when performing secret computation that uses the j-th secret sharing, the function value $[F([a_0], \ldots, [a_{M-1}])]$ while including in a checksum $C_j$, randomized shared values that are computation objects and randomized shared values that are computation results;

wait until all of secret computation that uses secret sharing are completed; and verify that the shared value $[\varphi_j]$ obtained by multiplying the sum of shared values $[f_0], \ldots, [f_{\mu j-1}]$ included in the checksum $C_j:=(<f_0>, \ldots, <f_{\mu j-1}>)$ by the shared value $[r_j]$ is equal to the shared value $[\psi_j]$ obtained by adding shared values $[f_0 r_j], \ldots, [f_{\mu j-1} r_j]$ included in the checksum $C_j:=(<f_0>, \ldots, <f_{\mu j-1}>)$, wherein, for $j=0, \ldots, J-1$, $\mu_j$ indicates the total number of randomized shared values included in the j-th checksum $C_j$, and $<f_0>, \ldots, <f_{\mu j-1}>$ indicate the randomized shared values included in the j-th checksum $C_j$;

wherein when it is determined that no falsification is found after verifying all of J checksums $C_0, \ldots, C_{J-1}$, the system outputs the function value $[F([a_0], \ldots, [a_{M-1}])]$, and when it is determined that falsification is found, the system outputs information indicating that falsification is found, wherein j' is an integer equal to or larger than 0 and smaller than J, $j \neq j'$, the j-th secret sharing and the j'-th secret sharing are on an identical ring, and the j-th secret sharing can be converted to the j'-th secret sharing with a method in which falsification can be detected or a method in which falsification is impossible, the shared value $[r_j]$ is generated by secret sharing the random number $r_j$ by the j-th secret sharing, and the shared value $[r_j]$ is converted to a shared value $[r_{j'}]$ obtained by the j'-th secret sharing, and the shared value $[\varphi_j]$ calculated from the j-th checksum $C_j$ and the shared value $[\psi_j]$ calculated from the checksum $C_j$ are converted to shared values obtained by the j'-th secret sharing, and it is verified that the shared value $[\psi_j + \psi_{j'}]$ obtained by adding the shared value $[\psi_j]$ to the shared value $[\psi_{j'}]$ calculated from the j'-th checksum $C_{j'}$ is equal to the shared value $[\psi_j + \psi_{j'}]$ obtained by adding the shared value $[\psi_j]$ to the shared value $[\psi_{j'}]$ calculated from the j'-th checksum $C_{j'}$.

4. A secret computation apparatus that is part of a secret falsification detecting system for detecting falsification during secret computation, with N secret computation apparatuses having, as inputs, shared values $[a_0], \ldots, [a_{M-1}]$ obtained by secret sharing M values $a_0, \ldots, a_{M-1}$ and, as an output, a function value $[F([a_0], \ldots, [a_{M-1}])]$ obtained with a function F for performing secret computation that uses J types of secret sharing, for detecting falsification during secret computation, the secret computation apparatus having, as inputs, shared values $[a_0], \ldots, [a_{M-1}]$ obtained by secret sharing M values $a_0, \ldots, a_{M-1}$ and, as an output, a function value $[F([a_0], \ldots, [a_{M-1}])]$ obtained with a function F for performing secret computation that uses J types of secret sharing, wherein M is an integer equal to or larger than 1, $\mu$ is an integer equal to or larger than 1, J is an integer equal to or larger than 2, m is an integer equal to or larger than 0 and smaller than M, and j is an integer equal to or larger than 0 and smaller than J;

the secret computation apparatus comprising:

circuitry configured to obtain shared values $[r_0], \ldots, [r_{J-1}]$ by distributing J random numbers $r_0, \ldots, r_{J-1}$ by the secret sharing such that the random numbers $r_0, \ldots, r_{J-1}$ are concealed from all of the N secret computation apparatuses;

calculate a shared value $[a_m r_j]$ by multiplying the shared value $[a_m]$ by the shared value $[r_j]$, and generate a randomized shared value $<a_m>:=<[a_m], [a_m r_j]>$ by pairing the shared value $[a_m]$ and the shared value $[a_m r_j]$, wherein the m-th shared value $[a_m]$ is a shared value obtained by the i-th secret sharing;

obtain, when performing secret computation that uses the i-th secret sharing the function value $[F([a_0], \ldots, [a_{M-1}])]$ while including, in a checksum $C_j$, randomized shared values that are computation objects and randomized shared values that are computation results;

wait until all of secret computation that uses secret sharing are completed; and verify that the shared value $[\varphi_j]$ obtained by multiplying the sum of shared values $[f_0], \ldots, [f_{\mu j-1}]$ included in the checksum $C_j:=(<f_0>, \ldots, <f_{\mu j-1}>)$ by the shared value $[r_j]$ is equal to the shared value $[\psi_j]$ obtained by adding shared values $[f_0 r_j], \ldots, [f_{\mu j-1} r_j]$, included in the checksum $C_j:=(<f_0>, \ldots, <f_{\mu j-1}>)$, wherein, for $j=0, \ldots, J-1$, $\mu_j$ indicates the total number of randomized shared values included in the i-th checksum $C_j$, and $<f_0>, \ldots, <f_{\mu j-1}>$ indicate the randomized shared values included in the i-th checksum $C_j$; and wherein when it is determined that no falsification is found after verifying all of J checksums $C_0, \ldots, C_{J-1}$, the system outputs the function value $[F([a_0], \ldots, [a_{M-1}])]$, and when it is determined that falsification is found, the system outputs information indicating that falsification is found, wherein j' is an integer equal to or larger than 0 and smaller than J, $j \neq j'$, the j-th secret sharing and the j'-th secret sharing are on an identical ring, and the j-th secret sharing can be converted to the j'-th secret sharing with a method in which falsification can be detected or a method in which falsification is impossible, the shared value $[r_j]$ is generated by secret sharing the random number $r_j$ by the j-th secret sharing, and the shared value $[r_j]$ is converted to a shared value $[r_{j'}]$ obtained by the j'-th secret sharing, and the shared value $[\varphi_j]$ calculated from the j-th checksum $C_j$ and the shared value $[\psi_j]$ calculated from the checksum $C_j$ are converted to shared values obtained by the j'-th secret sharing, and it is verified that the shared value $[\varphi_j + \varphi_{j'}]$ obtained by adding the shared value $[\varphi_j]$ to the shared value $[\varphi_{j'}]$ calculated from the j'-th checksum $C_{j'}$ is equal to the shared value $[\psi_j + \psi_{j'}]$ obtained by adding the shared value $[104_j]$ to the shared value $[\psi_{j'}]$ calculated from the j'-th checksum $C_{j'}$.

5. A non-transitory computer readable medium including computer executable instructions that make a secret computation apparatus for detecting falsification during secret computation perform a secret falsification detecting method, the secret computation apparatus having, as inputs, shared values $[a_0], \ldots, [a_{M-1}]$ obtained by secret sharing M values $a_0, \ldots, a_{M-1}$ and, as an output, a function value $[F([a_0], \ldots, [a_{M-1}])]$ obtained with a function F for performing secret computation that uses J types of secret sharing, wherein M is an integer equal to or larger than 1, μ is an integer equal to or larger than 1, J is an integer equal to or larger than 2, m is an integer equal to or larger than 0 and smaller than M, and j is an integer equal to or larger than 0 and smaller than J;

the secret falsification detecting method comprising:

obtaining shared values $[r_0], \ldots, [r_{J-1}]$ by distributing J random numbers $r_0, \ldots, r_{J-1}$ by the secret sharing such that the random numbers $r_0, \ldots, r_{J-1}$ are concealed from all of the N secret computation apparatuses;

calculating a shared value $[a_m r_j]$ by multiplying the shared value $[a_m]$ by the shared value $[r_j]$, and generating a randomized shared value $<a_m>:=<[a_m], [a_m r_j]>$ by pairing the shared value $[a_m]$ and the shared value $[a_m r_j]$, wherein the m-th shared value $[a_m]$ is a shared value obtained by the j-th secret sharing;

obtaining, when performing secret computation that uses the j-th secret sharing, the function value $[F([a_0], \ldots, [a_{M-1}])]$ while including, in a checksum $C_j$, randomized shared values that are computation objects and randomized shared values that are computation results;

waiting until all of secret computation that uses secret sharing are completed; and verifying that the shared value $[\varphi_j]$ obtained by multiplying the sum of shared values $[f_0], \ldots [f_{\mu_j-1}]$ included in the checksum $C_j:=(<f_0>, \ldots, <f_{\mu_j-1}>)$ by the shared value $[r_j]$ is equal to the shared value $[\psi_j]$ obtained by adding shared values $[f_0 r_j], \ldots, [f_{\mu_j-1} r_j]$ included in the checksum $C_j:=(<f_0>, \ldots, <f_{\mu_j-1}>)$, wherein, for $j=0, \ldots, J-1$, $\mu_j$ indicates the total number of randomized shared values included in the j-th checksum $C_j$, and $<f_0>, \ldots, <f_{\mu_j-1}>$ indicate the randomized shared values included in the i-th checksum $C_j$; and when it is determined that no falsification is found after verifying all of J checksums $C_0, \ldots, C_{J-1}$, outputting the function value $[F([a_0], \ldots, [a_{M-1}])]$, and when it is determined that falsification is found, outputting information indicating that falsification is found, wherein j' is an integer equal to or larger than 0 and smaller than J, j≠j', the j-th secret sharing and the j'-th secret sharing are on an identical ring, and the j-th secret sharing can be converted to the j'-th secret sharing with a method in which falsification can be detected or a method in which falsification is impossible, the shared value $[r_j]$ is generated by secret sharing the random number $r_j$ by the j-th secret sharing, and the shared value $[r_j]$ is converted to a shared value $[r_{j'}]$ obtained by the j'-th secret sharing, and the shared value $[\varphi_j]$ calculated from the j-th checksum $C_j$ and the shared value $[\psi_j]$ calculated from the checksum $C_j$ are converted to shared values obtained by the j'-th secret sharing, and it is verified that the shared value $[\varphi_j+\varphi_{j'}]$ obtained by adding the shared value $[\varphi_j]$ to the shared value $[\varphi_{j'}]$ calculated from the j'-th checksum $C_{j'}$ is equal to the shared value $[\psi_j+\psi_{j'}]$ obtained by adding the shared value $[\psi_j]$ to the shared value $[\psi_{j'}]$ calculated from the j'-th checksum $C_{j'}$.

* * * * *